(12) United States Patent
Yurkovic

(10) Patent No.: US 6,668,353 B1
(45) Date of Patent: Dec. 23, 2003

(54) SPACE/TIME PORTALS FOR COMPUTER SYSTEMS

(75) Inventor: Robert J. Yurkovic, Ringwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/276,244

(22) Filed: Mar. 25, 1999

(51) Int. Cl.[7] ............................................... G06F 17/21
(52) U.S. Cl. ..................................... 715/501.1; 715/513
(58) Field of Search ............................. 707/501.1, 513; 705/14; 715/701.1, 513

(56) References Cited

U.S. PATENT DOCUMENTS 5,983,227 A * 11/1999 Nazem et al. ................ 707/10
6,332,127 B1 * 12/2001 Bandera et al. ............... 705/14
6,353,398 B1 * 3/2002 Amin et al. ................. 340/995

* cited by examiner

Primary Examiner—Stephen S. Hong

(57) ABSTRACT

A portal defines a set of information requests used to gather various types of information in order to present to a user a single composite display that essentially provides the user with his or her own personal web page or view of information. A space/time portal is a particular type of portal whose set of information requests is automatically modified as a function of a specified location or a specified time or both. In one configuration, the specified location and time are themselves selected automatically to modify the space/time portal in real time based on the current location and time for the user. In another configuration, the user can manually change the selection of the specified location and/or time. The space/time portal is then automatically modified based on the new selections, and the composite display is updated in real time accordingly.

19 Claims, 5 Drawing Sheets

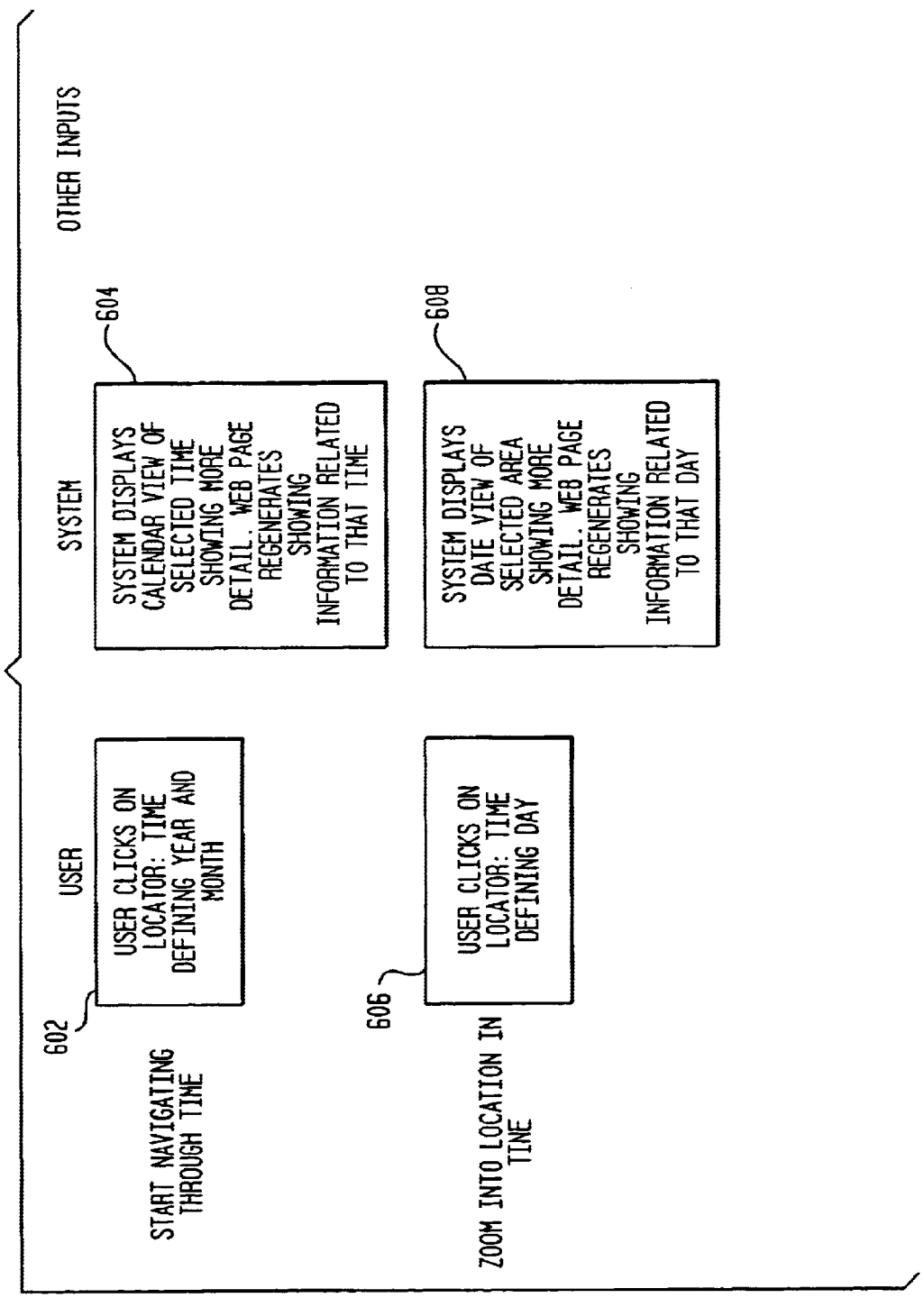

SPACE/TIME PORTALS FOR COMPUTER SYSTEMS

BACKGROUND OF THE INVENTION

1. Field of the Invention

The present invention relates to computer networks, such as the Internet or World Wide Web, and, in particular, to portals used to retrieve customized sets of information during web browsing and other network access activities.

2. Description of the Related Art

Computer networks, such as the Internet or World Wide Web, enable users to access an almost unlimited amount of information. Although web browsers and other applications for Internet searching exist to enable users to locate any and all available information, many users are interested in receiving the same types of information during each of their web browsing sessions. For example, a particular user may be interested in the current prices of specific stocks that he owns, the latest scores for his favorite sports teams, his daily horoscope, and the weather report for his home town. For such users, personal portals are being provided by a number of Internet service providers and web servers.

A personal portal is a network search tool that defines a set of user-selected information requests. Whenever the user accesses the network through his personal portal, the portal gathers information satisfying the specified requests from one or more network-based databases and presents that information to the user as a computer display with a composite format, thereby providing the user with what is essentially his own personal, customized web page. One such personal portal service is the "My Netscape" portal provided by Netscape Communications Corporation of Mountain View, Calif.

The one or more databases from which information is gathered to satisfy the portal requests are frequently if not constantly updated so that the set of information provided to the user is current (e.g., the current weather report, the horoscope for current date). Thus, every time the user accesses the network through his personal portal, the particular information presented to the user will be different, even if the set of information requests defined by the portal have not changed. Some personal portals may even automatically update the information presented to the user in real time during a particular network access session as the databases from which that information is gathered are themselves updated. Although a user may be able to modify manually his personal portal to change the defined set of information requests (e.g., adding and deleting stocks to reflect changes in the composition of his personal stock portfolio), nevertheless, between such manual changes to the portal definition, the set of portal requests is static, with only the databases of information being updated over time.

SUMMARY OF THE INVENTION

The present invention is directed to portals that are automatically modified as a function of either space or time or both. With a so-called space/time portal of the present invention, the set of requests defined for the portal is modified automatically as a function of either a specified location or a specified time or both, independent of whether or not the information databases used to satisfy those portal requests are themselves also updated over time. Depending on the implementation, the specified location and/or time may be selected automatically or manually by the user.

In one embodiment, the present invention is a computer-based server configured to provide access to a user via a portal through which information is presented to the user in a composite format, wherein the portal defines a set of information requests used to gather the information presented to the user, and the set of information requests for the portal is modified automatically as a function of a specified location, a specified time, or both.

In another embodiment, the present invention is a method for presenting information to a user accessing a computer-based server, comprising the steps of (a) providing a portal to the user, wherein the portal defines a set of information requests used to gather the information presented to the user; (b) selecting a specified location, a specified time, or both corresponding to the user; (c) automatically modifying the set of information requests corresponding to the portal as a function of the specified location, the specified time, or both; and (d) using the modified portal to gather the information for presentation to the user in a composite format.

The present invention addresses the problem of information overload by accessing high priority and relevant information through intelligent filtering while accessing information using web technology. The space/time portals of the present invention allow users to locate themselves at a particular point in space and time using a web locator window with a personal view of their information. Space/time portals can be used to gather personal information as well as shared information from other sources based on a specified location and/or a specified time. The present invention eases web navigation by decreasing web searches and eliminating web clicks to find essential information. The present invention is particularly well suited for, but certainly not limited to, the average business manager.

A web designed around a database back-end tied to an integrated management application can provide custom information to a user via a personal web page. The locator window of the present invention pinpoints the user's information requirements. The combination of a database back-end for all information storage and a dynamic web page displaying information specific to a user's needs at a specified location and time allows fast access to web-based information with minimal navigation. The database holds information from many people allowing cross-referencing and information viewing across many people or a group of people.

A GPS (global positioning system) processor can be integrated to a user's PC (personal computer) or PDA (personal data assistant) to determine his current location in space and a clock in the PC or PDA establishes a current location in time as default. As the user shifts views in space and time, information will be generated from sources and dynamically published to a web page. This web page may contain general information (such as news and events), personal information (such as action items, schedules, and meetings), and shared information (such as project calendars, action items owned by others, and project notes).

The present invention relates to a new design for a personal web portal with dynamic page generation utilizing access methods that are highly accepted by the public, such as calendaring and mapping. The present invention allows users the option of multiple platforms (e.g., SUN workstations, Windows-based PCs, Apple Macintosh computers). The present invention enables collaboration between users through a common port of entry and extraction.

BRIEF DESCRIPTION OF THE DRAWINGS

Other aspects, features, and advantages of the present invention will become more fully apparent from the following detailed description, the appended claims, and the accompanying drawings in which:

FIG. 6 shows a flow diagram representing exemplary processing implemented at the user and at the web portal server for the network of FIG. 3 when the user uses the locator cell of FIG. 2 to change the selection of the specified time for the user's personalized space/time portal.

DETAILED DESCRIPTION

Figure 1:
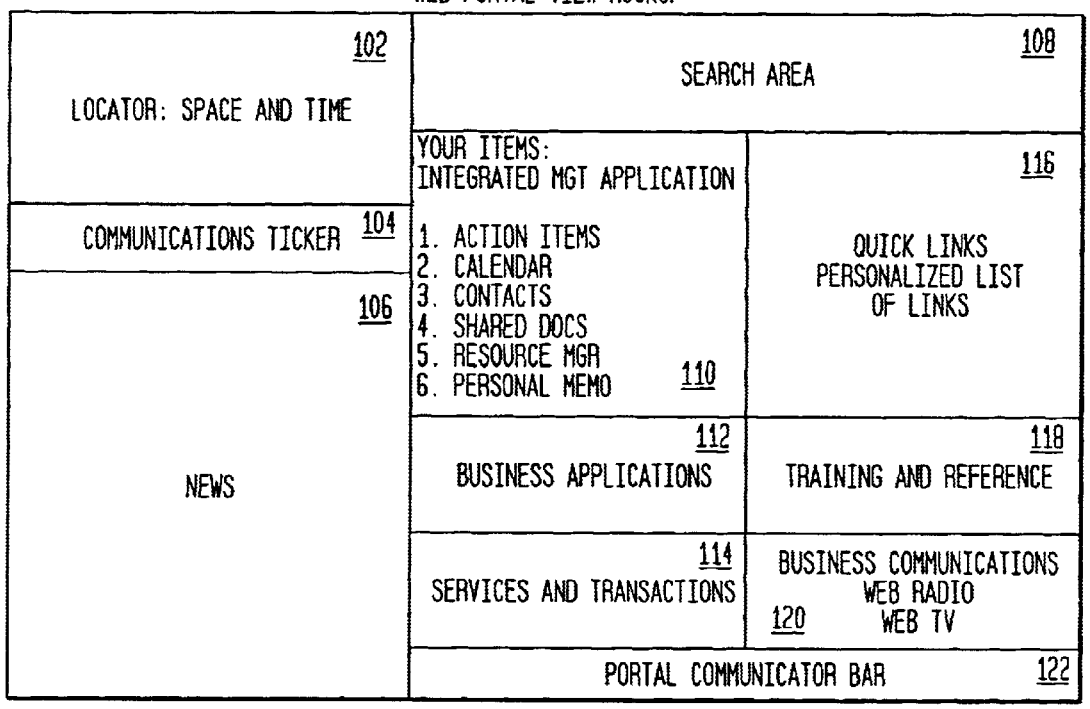
FIG. 1 shows a generic representation of a composite display generated on a user's monitor during network access through a space/time portal, according to one embodiment of the present invention.

According to the present invention, a space/time portal is a portal whose defined set of information requests is automatically modified as a function of a specified location and/or a specified time. As the specified location and/or time changes, the set of information requests defined for the portal is automatically modified. As a result, not only is information itself updated as the databases from which the information is gathered are updated over time, but the types of information themselves defined by the portal requests also vary as the specified location and/or time varies. As with conventional portals, the information gathered during network access through a space/time portal may be gathered from a single network-based information database or from any number of different databases available on the network.

Depending on the particular implementation, there are a number of different possible ways in which time and/or location can be specified. For example, time can be specified automatically to correspond to the user's current time. That clock signal may be generated local to the user (e.g., the system clock of the user's computer) or received from some appropriate remote source (e.g., the network server accessed by the user's computer). Alternatively, time can be specified manually by the user to allow the user to select a date and/or time of day other than the current date and/or time of day.

Analogously, location can be specified automatically to correspond to the user's current location, e.g., as determined from GPS signals received by at the user's computer. Alternatively, location can be specified manually by the user to allow the user to select a location other than the user's current location.

Assume, for example, that a particular user typically accesses the Internet through her personal space/time portal using her portable laptop computer from one of three different locations: her residence, her office, or her vacation home. Assume further that the user's space/time portal is configured to specify location automatically based on GPS signals received at the laptop. In that case, the specified location used to modify the user's space/time portal will be the current location of the laptop. Assume also that the user has pre-selected a different set of information requests for each of her three typical network access locations (residence, office, and vacation home). In that case, when the user accesses the network using her laptop, the specified location will be automatically selected to be the user's current location and her space/time portal will be automatically modified to select the set of information requests corresponding to that current location.

For example, when she accesses the network from her residence, the space/time portal will be automatically modified based on the specified location being her residence to gather and present information satisfying a pre-selected set of requests relevant to that location (e.g., the weather report for the vicinity of her residence, current road and traffic conditions for her commute to work, schedule of events for the local school district). Similarly, when she accesses the network from her office, the space/time portal will be automatically modified based on the specified location being her office to gather and present information satisfying a pre-selected set of requests relevant to that location (e.g., the weather report for the vicinity of her office, current road and traffic conditions for her commute back to her residence, her schedule of meetings for the day). Lastly, when she accesses the network from her vacation home, the space/time portal will be automatically modified based on the specified location being her vacation home to gather and present information satisfying a pre-selected set of requests relevant to that location (e.g., the weather report for the vicinity of her vacation home, available tee times at the golf courses near her vacation home, available reservation times at local restaurants).

Instead of being modified automatically as a function of location, a space/time portal of the present invention can also be configured to be modified automatically as a function of time. Assume in the previous example that the user has defined her work and vacation schedule for the year using a network-based calendar application in which she specifies which days of the year she will be at work, which days she will spend at her residence, and which days she will be at her vacation home. In that case, the space/time portal can be configured to be modified as a function of the current time, e.g., as automatically determined from the local system clock in the user's laptop. In particular, the current time is used to access the calendar application to determine which of three pre-selected sets of requests (i.e., corresponding to a work day, a home day, or a vacation day) is to be used to gather information through the space/time portal.

In addition to being configured to select automatically the specified location and/or time used to modify the space/time portal, a space/time portal can be configured to have the specified location and/or time selected manually by the user. For example, assume in the previous example that the user is currently at her office on Monday morning, but she wants to plan her schedule for the upcoming weekend to be spent at her vacation home. Rather than have her space/time portal be automatically modified based on her current location (i.e., office) and current time (i.e., Monday morning), the user can manually select the specified location for the space/time portal to be her vacation home. As such, the space/time portal will be modified to gather information corresponding to her vacation home. Depending on the set of portal requests defined for the specified location being her vacation home, this may not suit her needs. For example, knowing the available tee times for the golf courses in the vicinity of her vacation home for the current time (i.e., Monday morning) is not going to help her out for the coming weekend. In that case, the space/time portal can, be configured to allow her to select manually both the specified location and the specified time, so that, from her office on Monday morning, she can select both the specified location to be her vacation home and the specified time to be the next Saturday. As such, the user will be able to see the available tee times for an appropriate location and date.

In the above examples, the modifications to the space/time portal were limited to three discrete sets of information requests that were pre-selected by the user for three different specified locations or three different specified times. The present invention can also be implemented to provide "continuous" modification of space/time portals. For example, a space/time portal according to the present invention can be configured to provide the weather report for the region centered on the specified location, wherever that specified location is. If the specified location is automatically selected to be the user's current location based on GPS signals received at the user's laptop, then the space/time portal will provide the relevant weather report for the user's current location, no matter where that current location is. Moreover, the specified location can be updated in real time as the user's current location changes. For example, a mobile user in a car or airplane will automatically be presented with continuously updated information as the user's current location changes.

FIG. 1 shows a generic representation of a composite display 100 generated on a user's monitor during network access through a space/time portal, according to one embodiment of the present invention. Display 100 is analogous to a user's personal web page. According to the present invention, the information presented in one or more of the constituent cells of display 100 satisfies space/time portal requests that are modified automatically as a function either the specified location or the specified time or both. As shown, display 100 comprises the following constituent cells:

A space/time locator cell 102 that enables the user to modify manually the selection of the specified location and/or time.

A communications ticker cell 104 that displays a summary of personalized news specifically relevant to the user;

A news cell 106 that displays a summary of news items gathered through the space/time portal;

A search area cell 108 that enables the user to perform text-based web searching;

An integrated management application cell 110 that provides link lists that enable the user to execute different web-based application programs;

A business applications cell 112 that provides link lists that enable the user to execute different web-based business application programs;

A services and transactions cell 114 that displays a summary of annual or periodic maintenance functions;

A quick links cell 116 that provides a personalized list of links for the user;

A training and reference cell 118 that provides access to various local training and/or reference services;

A business communications cell 120 that renders web-based radio and/or television programming; and A portal communicator bar 122 that alerts the user of special events or items requiring attention relative to their position in space and time.

In the example presented earlier, display 100 may correspond to the information gathered and presented by the space/time portal on the user's laptop when the specified location is the user's office and/or the specified time is a work day. In one implementation, the user is presented with a series of graphical user interfaces (GUIs) asking the user to enter or select preferences corresponding to different types of information in order to customize the space/time portal.

Navigation through the space/time portal corresponding to display 100 to retrieve specific information can be accomplished a number of different ways. The user can use the search area cell 108 to access a search engine using text-based searching to retrieve specific information from different databases. Alternatively, the user can access information using the link lists provided in the various cells of display 100. In addition, the user can use the space/time locator cell 102 to select manually the specified location and/or the specified time used to modify automatically the space/time portal.

Figure 2:
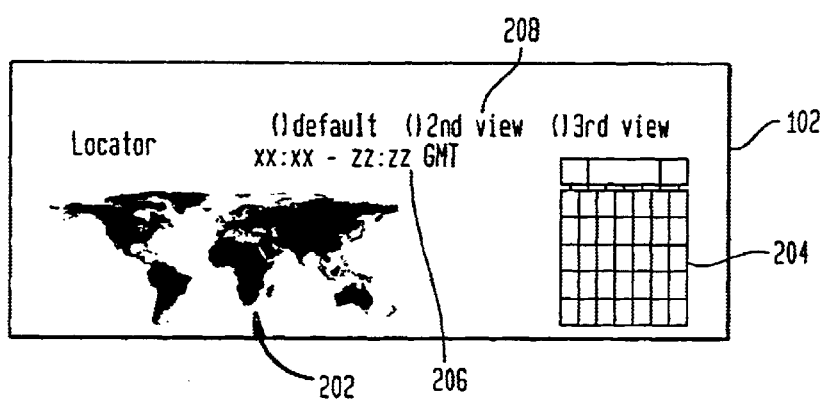
FIG. 2 shows a more detailed representation of the space/time locator cell of the composite display of FIG. 1.

FIG. 2 shows a more detailed representation of the space/time locator cell 102 of display 100 of FIG. 1. Locator cell 102 displays a map 202, a calendar 204, a time-of-day field 206, and a set of possible views 208 (i.e., default view, $2^{nd}$ view, and $3^{rd}$ view).

Using the computer's mouse-driven pointer, the user can manually select the specified location for the space/time portal by selecting a specific point on the map 202. The specified location is then used to modify automatically the space/time portal. In addition to selecting the specified location, selecting a point on the map 202 may also result in a zooming operation that redisplays an expanded view of the map zooming in on the specified location. The zooming operation may also affect the size of the region of interest surrounding the specified location that is used to modify the space/time portal. The greater the zooming, the smaller the region of interest (e.g., statewide weather reports rather than countrywide weather reports being generated by the space/time portal). This zooming operation can be repeated to continue to refine the selection of the specified location and to continue to reduce the size of the region of interest surrounding the specified location (e.g., citywide weather reports rather than statewide weather reports).

In an analogous fashion, the calendar 204 and the time-of-day field 206 can be used to select manually the specified time used to modify automatically the space/time portal. When only the calendar 204 is used, the resolution of the specified time used to modify the space/time portal may be limited to the day, the month of year, or even the year as a whole. The resolution of the specified time can be narrowed to include the time of day (or a range of time) in hours or even minutes using the time-of-day field 206 in conjunction with the calendar 204. Zooming in and out can also be implemented for calendar 204, with available displays corresponding to representations of a single day, an entire month, or an entire year.

The three available views 208 (i.e., default view, $2^{nd}$ view, and $3^{rd}$ view) allow the user to predefine up to three different sets of portal requests for different specified locations and/or specified times. Referring once again to the previous example, the default view may correspond to the space/time portal modified for the user's residence, the $2^{nd}$ view may correspond to the-space/time portal modified for the user's office, and the $3^{rd}$ view may correspond to the space/time portal modified for the user's vacation home. These options allow the user to specify manually and quickly how the space/time portal should be modified for routine network access sessions. In this example, the map 202, calendar 204, and time-of-day field 206 can be used to select manually combinations of specified location and time other than the three pre-defined views 208.

Figure 3:
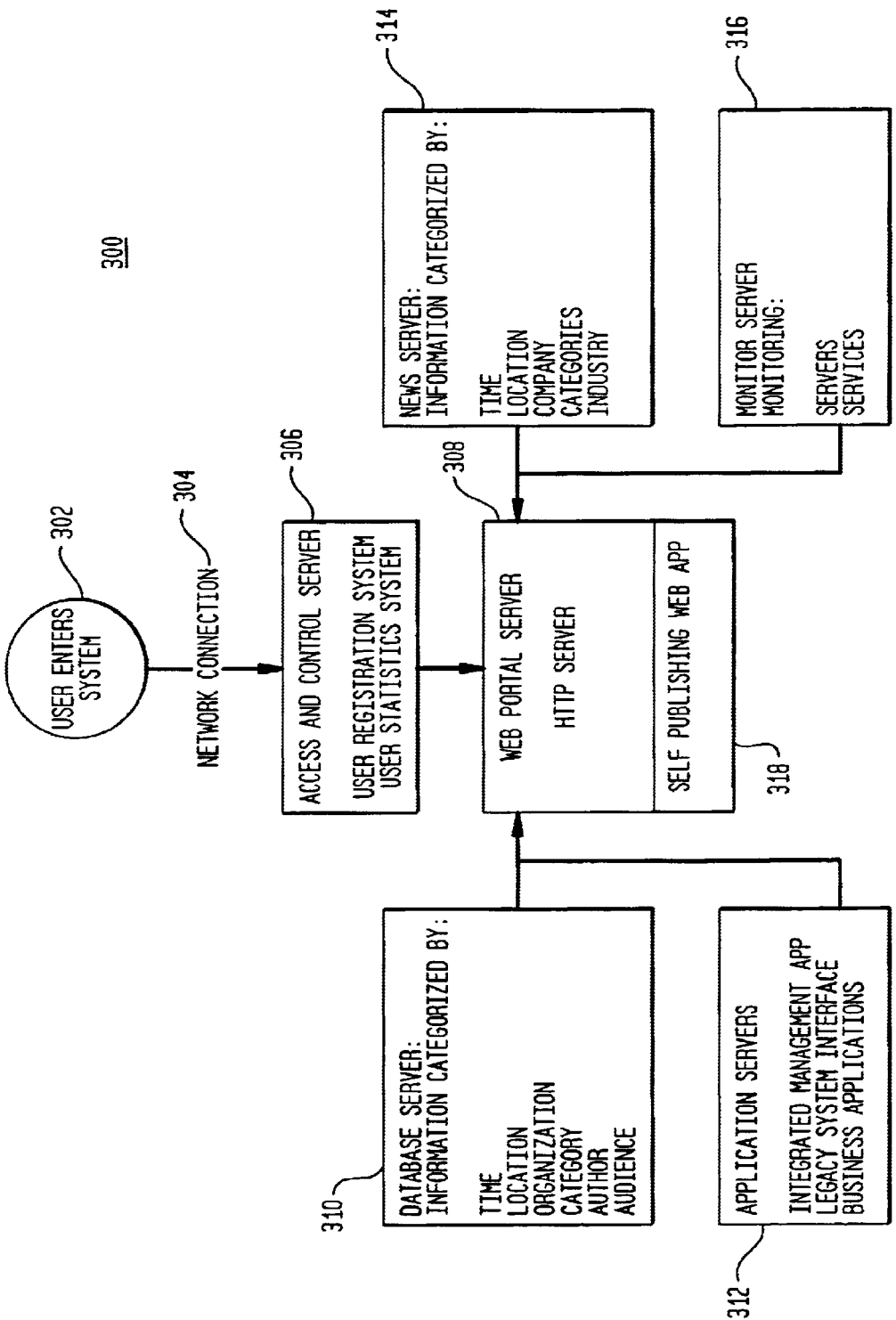
FIG. 3 shows a block diagram of a network configuration used to support the use of a personalized space/time portal by a particular user, according to one embodiment of the present invention.

FIG. 3 shows a block diagram of a network configuration 300 used to support the use of a personalized space/time portal by a particular user, according to one embodiment of the present invention. As shown in FIG. 3, user 302 accesses, via network connection 304, an access and control server 306 which implements a user registration system to manage and control the user's access to the network. Access and control server 306 also implements a user statistics system to log the user's navigation through the network.

The user's personal web page, such as display 100 of FIG. 1, is generated by web portal server 308 which executes the user-configured space/time portal to gather the information for display 100. The information for the display is gathered by web portal server 308 using any of a number of different available servers, including database server 310, application server 312, news server 314, and monitor server 316. News server 314 provides a database of news-related information organized by time, location, company, categories, and industry. Database server 310 provides a database of other information organized by time, location, organization, category, author, and audience. Application server 312 provides integrated management applications, interfaces to legacy systems, and business applications. Monitor server 316 provides access to other miscellaneous servers and services. All user-generated information is stored and published in self-publishing web application 318. User-specific preferences and other criteria used to define the user's space/time portal are stored on either access and control server 306 and web portal server 308.

In network configuration 300 in FIG. 3, most if not all of the intelligence related to the space/time portal is resident on the network side of network connection 304. As such, the sophistication required at the user's equipment 302 is minimal, thereby enabling the use of relatively simple and inexpensive user equipment (e.g., a television set-top box) to support web access via the space/time portals of the present invention.

Figure 4:
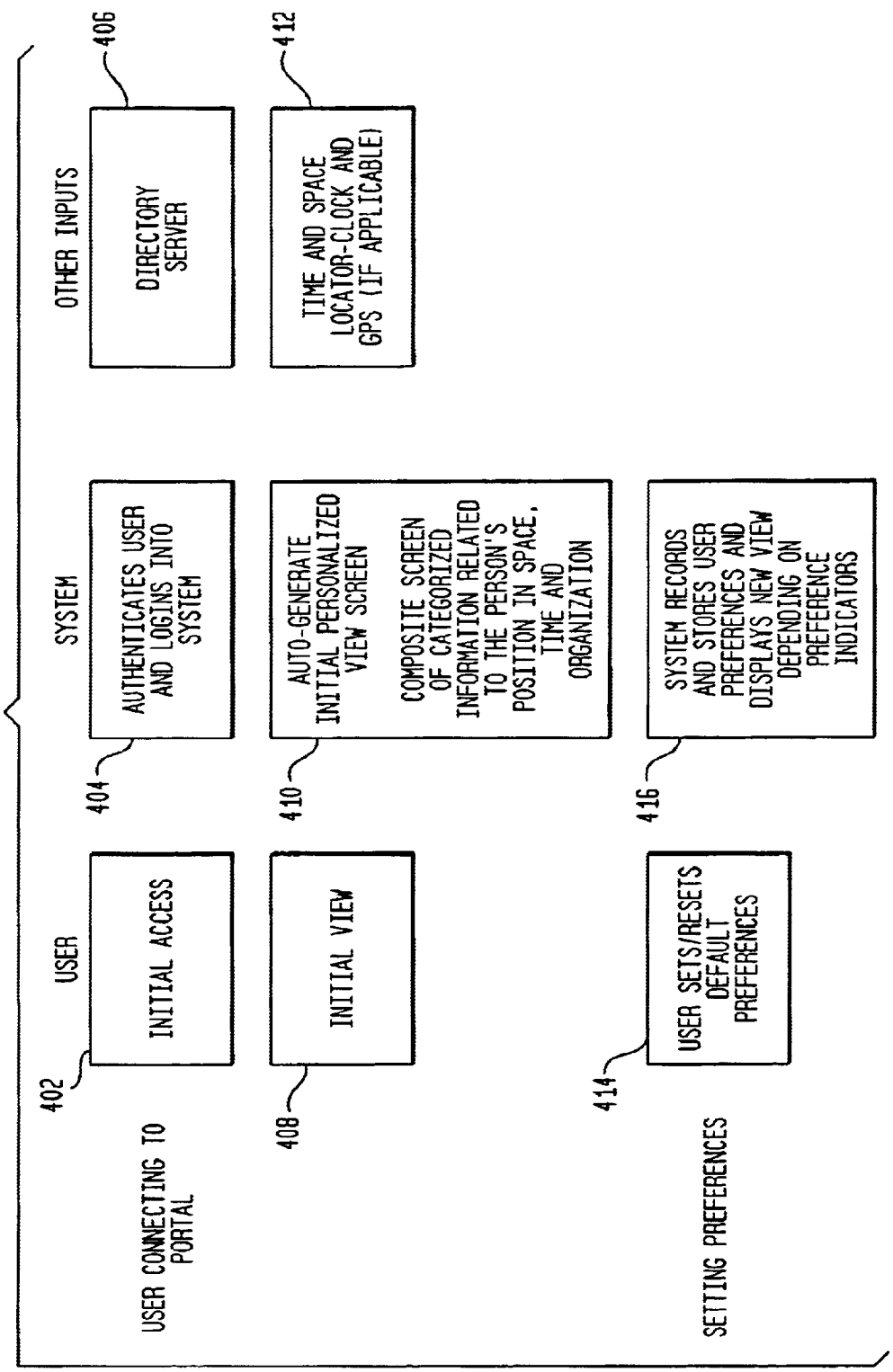
FIG. 4 shows a flow diagram representing exemplary processing implemented at the user and at the network servers for the network of FIG. 3 for the beginning of a web-browsing session through a personalized space/time portal.

FIG. 4 shows a flow diagram representing exemplary processing implemented at the user 302 and at the network servers 306 and 308 for network 300 of FIG. 3 for the beginning of a web-browsing session through the user's personalized space/time portal. When user 302 initiates access to the network (block 402), access and control server 306 authenticates the user and login information for access to the network (block 404). Directory server (block 406) provides further information about the user (e.g., office location and organization within company) for use in determining access privileges and filtering information for the user. Using self-publishing web application 318, web portal server 308 executes the user's personal space/time portal (block 410) as modified by an automatically selected specified location and/or an automatically selected specified time (block 412) to generate a composite display of information for presentation on the user's monitor (block 408).

After the connecting to the network through the portal, the user is able to use her personal web page to change the selection of defaults and the definitions of portal requests (block 414). In response, web portal server 308 records and stores the updated user preferences for future use. In addition, web portal server 308 modifies the space/time portal in real time based on any changes made by the user to the specified location and/or time and updates accordingly the composite display of information presented to the user (block 416).

Figure 5:
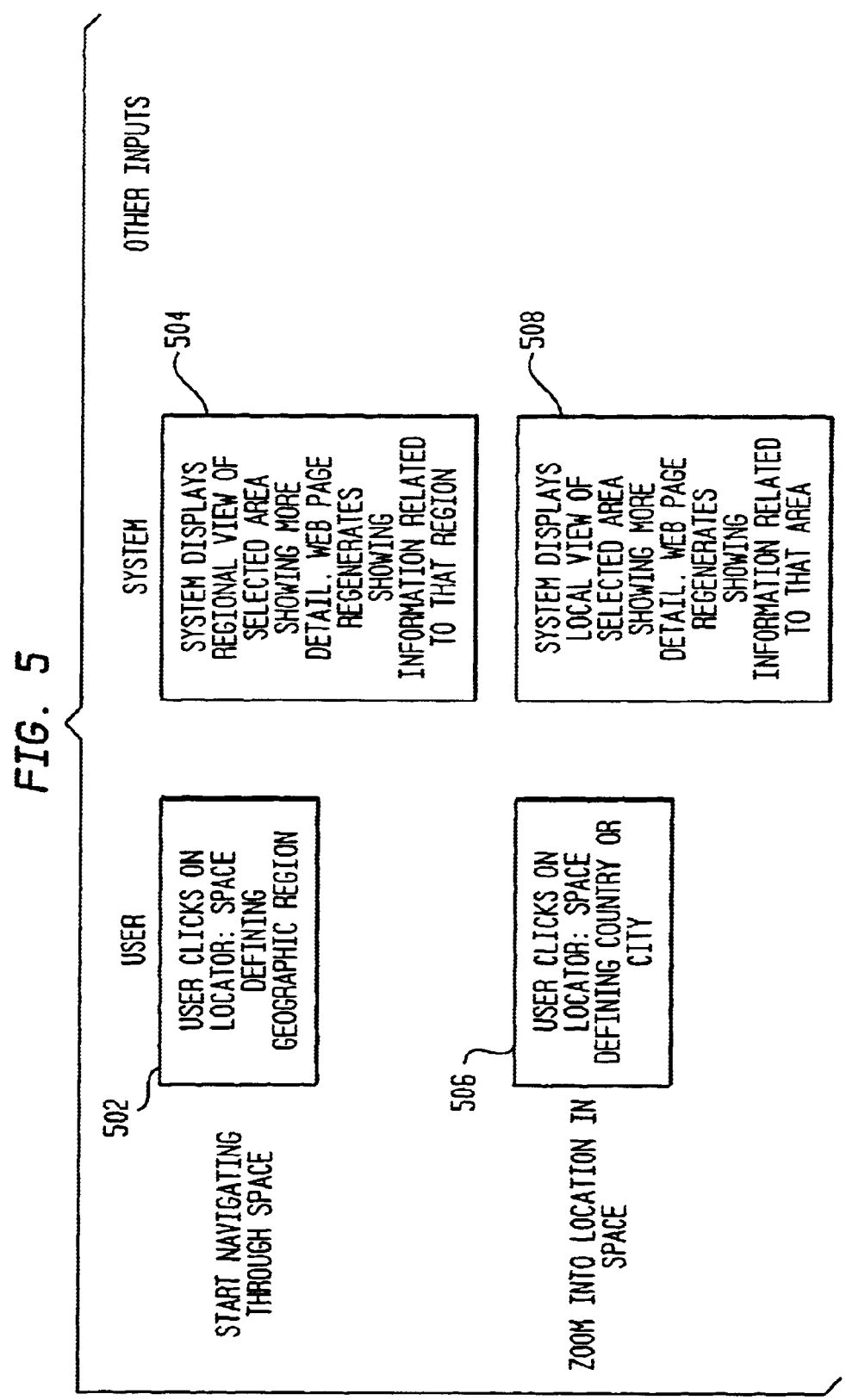
FIG. 5 shows a flow diagram representing exemplary processing implemented at the user and at the web portal server for the network of FIG. 3 when the user uses the locator cell of FIG. 2 to change the selection of the specified location for the user's personalized space/time portal.

FIG. 5 shows a flow diagram representing exemplary processing implemented at the user 302 and at the web portal server 308 for network 300 of FIG. 3 when the user uses locator cell 102 of FIG. 2 to change the selection of the specified location for the user's personalized space/time portal. Using the computer mouse, the user selects a point on map 202 of locator 102 to select a new specified location (block 502). In response, web portal server 308 updates the display of map 202 to show the selected area with more detail (block 504). In addition, web portal server 308 modifies the user's space/time portal based on the new specified location and regenerates the personal web page showing information related to new specified location (block 504). As the user continues to modify the selection of the specified location using map 202 (block 506), web portal server 308 continues to update the display of map 202 to zoom in on the specified location and regenerate the personal web page accordingly (block 508).

FIG. 6 shows a flow diagram representing exemplary processing implemented at the user 302 and at the web portal server 308 for network 300 of FIG. 3 when the user uses locator cell 102 of FIG. 2 to change the selection of the specified time for the user's personalized space/time portal. Using the computer mouse, the user access calendar 204 of locator 102 to select a year, month, and day corresponding to a new specified time (block 602). In response, web portal server 308 updates the display of calendar 204 to show the selected time with more detail (e.g., representing a single day instead of a month) (block 604). In addition, web portal server 308 modifies the user's space/time portal based on the new specified time and regenerates the personal web page showing information related to new specified time (block 604). The user can select the specified time with even more precision (i.e., hours and minutes) using the time-of-day field 206 of locator 102 (block 606). In response, web portal server 308 updates the display of the time-of-day field 206 showing more detail and again regenerate the personal web page accordingly (block 608).

In addition to network 300 of FIG. 3, the present invention can be applied to a variety of other network configurations. For example, although the invention has been described in the context of internets, such as the World Wide Web, the invention can also be implemented in the context of other types of computer networks, including intranets.

The equipment used by a user to navigate the network through a space/time portal can be any suitable type of equipment used for such a purpose including a computer terminal, a personal computer (PC), a portable laptop computer, a television set-top box, or a personal data assistant (PDA). These examples include equipment that has a fixed location (e.g., a computer terminal, a PC, or a set-top box) as well as mobile equipment whose location can vary over time (e.g., a laptop or a PDA). Similarly, the communication links by which users access the network include permanent hard-wired links (e.g., computer network cabling or multi-media cable television service), temporary hard-wired links (e.g., a phone line with a quick-connect jack to be plugged into a laptop or PDA with a modem), and wireless connections (e.g., used by a wireless PDA).

Although the space/time portals described above are personal space/time portals that each individual user can customize, the present invention can also be applied to other portals including vertical portals, which are shared portals that are customized for groups of users. Even in the case of a vertical or other shared space/time portal, however, the set of information requests defined for the portal is still modified automatically for each session of network access by each individual user as a function of either the specified location or the specified time or both, where the specified location and/or time can be selected automatically or manually by the individual user for that session.

Although the displays generated using space/time portals have been described in terms of visual graphics, it will be understood that the personal web pages generated using the space/time portals of the present invention can include audio portions as well as other types of visual displays including video streams.

Although the present invention has been described in the context of accessing computer networks, such as the Internet, it will be understood that the present invention can also be implemented in the context of accessing a server that is not part of a larger network.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for presenting information to a user accessing a computer-based server, comprising the steps of:
   (a) enabling the user to define a plurality of information requests corresponding to different types of information, wherein:
      a subset of the information requests is used to gather the information presented to the user during access to the server by the user; and
      the types of information in the subset vary as a function of at least one of time and location of the user during the user's access to the server;
   (b) automatically determining the at least one of time and location of the user during the user's access to the server;
   (c) automatically modifying the types of information in the subset of information requests as the function of the at least one of time and location of the user; and
   (d) automatically gathering the information corresponding to the modified types of information in the subset of information requests and presenting the gathered information to the user.

2. The invention of claim 1, wherein:
   the types of information in the subset vary as a function of both the time and the location of the user during the user's access to the server;
   step (b) comprises the step of automatically determining both the time and the location of the user during the user's access to the server; and
   step (c) comprises the step of automatically modifying the types of information in the subset of information requests as the function of both the time and the location of the user.

3. The invention of claim 1, wherein a portal provides the user with the access to the server, wherein the portal defines the plurality of information requests.

4. The invention of claim 1, wherein the gathered information is presented to the user in a composite format that enables that user to modify one or more of (1) the definition of the information requests and (2) how the subset of information requests varies as the function of the at least one of time and location.

5. The invention of claim 1, wherein the user is able to manually modify how the subset of information requests varies as the function of the at least one of time and location.

6. The invention of claim 5, wherein:
   the types of information in the subset vary as a function of both the time and the location of the user during the user's access to the server;
   step (b) comprises the step of automatically determining both the time and the location of the user during the user's access to the server; and
   step (c) comprises the step of automatically modifying the types of information in the subset of information requests as the function of both the time and the location of the user;
   a portal provides the user with the access to the server, wherein the portal defines the plurality of information requests; and
   the gathered information is presented to the user in a composite format that enables that user to modify (1) the definition of the information requests and (2) how the subset of information requests varies as the function of the at least one of time and location.

7. The invention of claim 1, wherein:
   the types of information in the subset vary as a function of the location of the user during the user's access to the server;
   step (b) comprises the step of automatically determining the location of the user during the user's access to the server; and
   step (c) comprises the step of automatically modifying the types of information in the subset of information requests as the function of the location of the user.

8. The invention of claim 7, wherein:
   step (b) comprises the step of automatically changing the location of the user during the user's access to the server as a result of a change in actual location of the user relative to a previous access to the server by the user; and
   step (c) comprises the step of automatically modifying the types of information in the subset of information requests as the function of the change in the location of the user.

9. A computer-based server for presenting information to a user, wherein:
   the server enables the user to define a plurality of information requests corresponding to different types of information, wherein:
      a subset of the information requests is used to gather the information presented to the user during access to the server by the user; and the types of information in the subset vary as a function of at least one of time and location of the user during the user's access to the server;

the server automatically determines the at least one of time and location of the user during the user's access to the server;

the server automatically modifies the types of information in the subset of information requests as the function of the at least one of time and location of the user; and the server automatically gathers the information corresponding to the modified types of information in the subset of information requests and presents the gathered information to the user.

10. The invention of claim 9, wherein:

the types of information in the subset vary as a function of both the time and the location of the user during the user's access to the server;

the server automatically determines both the time and the location of the user during the user's access to the server; and the server automatically modifies the types of information in the subset of information requests as the function of both the time and the location of the user.

11. The invention of claim 9, wherein the server supports a portal that provides the user with the access to the server, wherein the portal defines the plurality of information requests.

12. The invention of claim 9, wherein the gathered information is presented to the user in a composite format that enables that user to modify one or more of (1) the definition of the information requests and (2) how the subset of information requests varies as the function of the at least one of time and location.

13. The invention of claim 9, wherein the user is able to manually modify how the subset of information requests varies as the function of the at least one of time and location.

14. The invention of claim 13, wherein:

the types of information in the subset vary as a function of both the time and the location of the user during the user's access to the server;

the server automatically determines both the time and the location of the user during the user's access to the server; and the server automatically modifies the types of information in the subset of information requests as the function of both the time and the location of the user;

a portal provides the user with the access to the server, wherein the portal defines the plurality of information requests; and the gathered information is presented to the user in a composite format that enables that user to modify (1) the definition of the information requests and (2) how the subset of information requests varies as the function of the at least one of time and location.

15. The invention of claim 9, wherein:

the types of information in the subset vary as a function of the location of the user during the user's access to the server;

the server automatically determines the location of the user during the user's access to the server; and the server automatically modifies the types of information in the subset of information requests as the function of the location of the user.

16. The invention of claim 15, wherein:

the server automatically changes the location of the user during the user's access to the server as a result of a change in actual location of the user relative to a previous access to the server by the user; and the server automatically modifies the types of information in the subset of information requests as the function of the change in the location of the user.

17. An apparatus for presenting information to a user, comprising:

(a) means for enabling the user to define a plurality of information requests corresponding to different types of information, wherein:

a subset of the information requests is used to gather the information presented to the user during access to the apparatus by the user; and the types of information in the subset vary as a function of at least one of time and location of the user during the user's access to the apparatus;

(b) means for automatically determining the at least one of time and location of the user during the user's access to the apparatus;

(c) means for automatically modifying the types of information in the subset of information requests as the function of the at least one of time and location of the user; and (d) means for automatically gathering the information corresponding to the modified types of information in the subset of information requests and presenting the gathered information to the user.

18. The invention of claim 17, wherein:

the types of information in the subset vary as a function of the location of the user during the user's access to the server;

means (b) comprises means for automatically determining the location of the user during the user's access to the server; and means (c) comprises means for automatically modifying the types of information in the subset of information requests as the function of the location of the user.

19. The invention of claim 18, wherein:

means (b) comprises means for automatically changing the location of the user during the user's access to the server as a result of a change in actual location of the user relative to a previous access to the server by the user; and means (c) comprises means for automatically modifying the types of information in the subset of information requests as the function of the change in the location of the user.

* * * * *